July 7, 1936.  A. E. BRICKMAN ET AL  2,046,545
BRAKE CONTROL CONDUIT
Filed Nov. 18, 1935
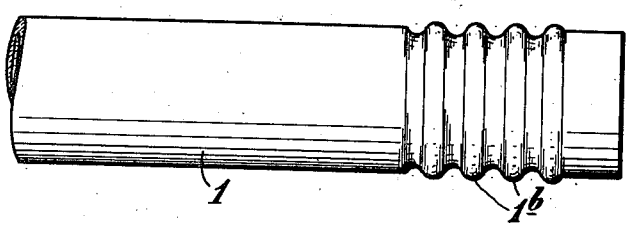
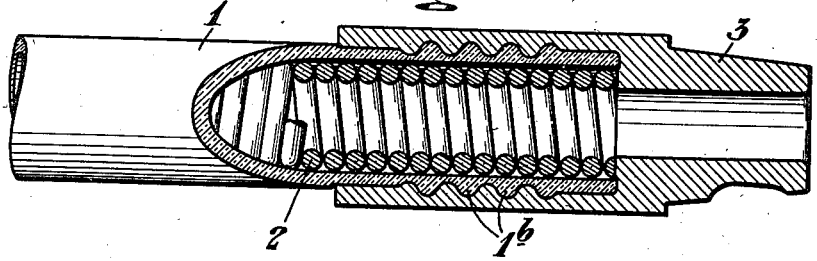
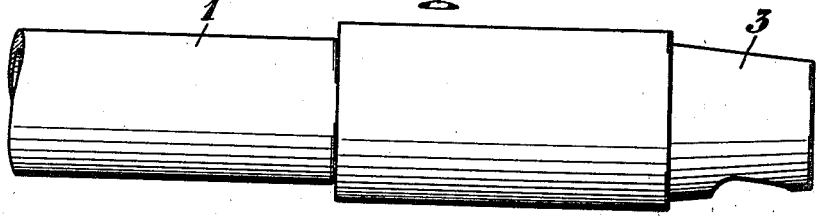
Inventors:
ALAN E. BRICKMAN and
GEORGE A. GLEASON,
by their Attorneys.

Patented July 7, 1936

2,046,545

UNITED STATES PATENT OFFICE 2,046,545

BRAKE CONTROL CONDUIT

Alan E. Brickman and George A. Gleason, Worcester, Mass., assignors to The American Steel and Wire Company of New Jersey, a corporation of New Jersey Application November 18, 1935, Serial No. 50,458

3 Claims. (Cl. 285—74)

This invention relates to flexible conduits which must be provided with end fittings, and is particularly concerned with flexible conduits of the type used to carry the control cables of automobile brakes, it being understood that such conduits must be provided with suitable end fittings for effecting their installation.

The accompanying drawing illustrates an example of the present invention.

Figure 1 is an elevation showing the end portion of the flexible conduit before the end fitting is applied to the same.

Figure 2 is a sectional view showing the end fitting applied to the conduit.

Figure 3 is an elevation showing the conduit with its end fitting assembled and ready for use.

More specifically, the drawing shows a tube 1 made of a dense rubber compound. This tube 1 is circumferentially corrugated at 1ᵇ so as to provide a series of circumferential recesses spaced from its end. Wire 2 is coiled concentrically inside of the tube 1 so as to provide a metallic surface for carrying a brake control cable. This wire is formed into a completely closed coil so as to provide a more nearly continuous surface.

An end fitting 3 is die cast about the outside of the tube 1 into the recesses provided by the corrugations 1ᵇ. It has been found that this may be done without affecting the chemical or physical character of the rubber compound from which the tube 1 is made in any manner, the tube being therefore of substantially the same character throughout, including the part about which the end fitting 3 is die cast. Furthermore, as the end fitting 3 cools after being die cast it shrinks, so as to constrict the tube and compress it between the end fitting and the coiled wire 2, the latter providing a relatively rigid wall which resists the constricting action involved.

The end fitting 3 will be die cast in a form suitable for the make of car to which the conduit is to be applied. Hence, the form in which it is illustrated is relatively immaterial excepting that it must be so die cast as to cover the corrugated portion of the tube 1, and preferably so as to extend a sufficiently great distance along the tube's outside to provide the strength required.

Although a specific example of the present invention has been disclosed in accordance with the patent statutes, it is to be understood that its scope is not to be limited exactly thereto, except as defined by the following claims.

We claim:

1. A cable conduit including the combination of a rubber compound tube, wire coiled inside of said tube for carrying a cable, the outside of said tube being provided with a plurality of circumferential recesses adjacent its end, and an end fitting die cast about the outside of said tube and into said recesses.

2. A cable conduit including the combination of a rubber compound tube, wire coiled inside of said tube for carrying a cable, the outside of said tube being provided with a plurality of circumferential recesses adjacent its end, and an end fitting die cast about the outside of said tube and into said recesses, said tube being of substantially the same character throughout including the part about which said end fitting is die cast.

3. A cable conduit including the combination of a rubber compound tube, wire coiled inside of said tube for carrying a cable, the outside of said tube being provided with a plurality of circumferential recesses adjacent its end, and an end fitting die cast about the outside of said tube and into said recesses, said tube being of substantially the same character throughout including the part about which said end fitting is die cast, and being constricted by said end fitting so as to be compressed between the latter and said wire.

ALAN E. BRICKMAN.
GEORGE A. GLEASON.